US006912656B1

(12) United States Patent
Perlman et al.

(10) Patent No.: US 6,912,656 B1
(45) Date of Patent: Jun. 28, 2005

(54) METHOD AND APPARATUS FOR SENDING ENCRYPTED ELECTRONIC MAIL THROUGH A DISTRIBUTION LIST EXPLODER

(75) Inventors: Radia J. Perlman, Acton, MA (US); Stephen R. Hanna, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/451,504

(22) Filed: Nov. 30, 1999

(51) Int. Cl.$^7$ .............................. H04L 9/00; G06F 15/16
(52) U.S. Cl. ........................................ 713/170; 709/206
(58) Field of Search ............................. 713/170; 380/20

(56) References Cited

U.S. PATENT DOCUMENTS

| | | | | |
|---|---|---|---|---|
| 5,729,608 A | * | 3/1998 | Janson et al. ................ | 713/171 |
| 5,751,813 A | * | 5/1998 | Dorenbos .................... | 713/153 |
| 5,790,790 A | * | 8/1998 | Smith et al. ................. | 709/206 |
| 6,073,242 A | * | 6/2000 | Hardy et al. ................. | 713/201 |
| 6,092,201 A | * | 7/2000 | Turnbull et al. ............. | 713/201 |
| 6,370,249 B1 | * | 4/2002 | Van Oorschot ............. | 380/277 |
| 6,584,566 B1 | * | 6/2003 | Hardjono .................... | 713/163 |
| 2003/0167403 A1 | * | 9/2003 | McCurley et al. | |

OTHER PUBLICATIONS

Schneier, Bruce, Applied Cryptography, 1996, John Wiley & Sons, Inc., 2$^{nd}$ Edition.*
Publication entitled, "Security–Enhanced Mailing Lists" to Michael Herfert, May 1, 1997, vol. 11, No. 3, pp. 30–33, XP000689787, ISSN: 0809–8044.
Publication entitled, "Securing Electronic Mail Systems" to Bob Serenelli and Tim Leisher, San Diego, Oct. 11, 1992, vol. 11, pp. 377–380, XP000346673, ISBN: 0–7803–0586–8.
Publication entitled, "On the Key Predistribution System: A Practical Solution to the Key Distribution Problem" to Tsutomu Matsumoto and Hideki Imai, Aug. 1987, vol. 7, pp. 185–193, XP000130202.
Network Security Private Communication in a Public World, by Charlie Kaufman, Radia Perlman, Mike Speciner, Prentice Hall, p. 338.

* cited by examiner

Primary Examiner—Guy J. Lamarre
Assistant Examiner—Christian La Forgia
(74) Attorney, Agent, or Firm—Park, Vaughan & Fleming LLP

(57) ABSTRACT

One embodiment of the present invention provides a system for sending an encrypted message through a distribution list exploder in order to forward the encrypted message to recipients on a distribution list. The system operates by encrypting the message at a sender using a message key to form an encrypted message. The system also encrypts the message key with a group public key to form an encrypted message key. The group public key is associated with a group private key to form a public key-private key pair associated with a group of valid recipients for the message. Next, the system sends the encrypted message and the encrypted message key to the distribution list exploder, and the distribution list exploder forwards the encrypted message to a plurality of recipients specified in the distribution list. After receiving the encrypted message and the encrypted message key, the recipient decrypts the encrypted message key to restore the message key. Next, the recipient decrypts the encrypted message using the message key to restore the message. In a variation on the above embodiment, the recipient decrypts the encrypted message key by sending the encrypted message key from the recipient to a group server, which holds the group private key. The group server decrypts the encrypted message key using the group private key to restore the message key, and returns the message key to the recipient in a secure manner.

14 Claims, 6 Drawing Sheets

METHOD AND APPARATUS FOR SENDING ENCRYPTED ELECTRONIC MAIL THROUGH A DISTRIBUTION LIST EXPLODER

BACKGROUND

1. Field of the Invention

The present invention relates to electronic mail and encryption of data. More particularly, the present invention relates to a method and an apparatus for sending encrypted electronic mail through a distribution list exploder that forwards the electronic mail to recipients on a distribution list.

2. Related Art

The advent of computer networks has led to an explosion in the development of applications that facilitate rapid dissemination of information. In particular, electronic mail is becoming the predominant method for communicating textual and other non-voice information. Using electronic mail, it is just as easy to send a message to a recipient on another continent as it is to send a message to a recipient within the same building. Furthermore, an electronic mail message typically takes only a few minutes to arrive, instead of the days it takes for surface mail to snake its way along roads and through airports.

One problem with electronic mail is that it is hard to ensure that sensitive information sent through electronic mail is kept confidential. This is because an electronic mail message can potentially traverse many different computer networks and many different computer systems before it arrives at its ultimate destination. An adversary can potentially intercept an electronic mail message at any of these intermediate points along the way.

One way to remedy this problem is to "encrypt" sensitive data using an encryption key so that only someone who possesses a corresponding decryption key can decrypt the message. (Note that for commonly used symmetric encryption mechanisms the encryption key and the decryption key are the same key.) A person sending sensitive data through electronic mail can encrypt the sensitive data using the encryption key before it is sent through email. At the other end, the recipient of the email can use the corresponding decryption key to decrypt the sensitive information.

Encryption works well for a message sent to a single recipient. However, encryption becomes more complicated for a message sent to multiple recipients. This is because encryption keys must be managed between a large number of recipients and the sender.

Conventional mail protocols, such as the Pretty Good Privacy (PGP) protocol, send mail to multiple recipients by encrypting a message with a message key (that is randomly selected for the message) to form an encrypted message. The message key is then encrypted with the public key of each of the recipients to form a set of encrypted keys. The set of encrypted keys is sent with the encrypted message to all of the recipients. Each recipient uses its private key to decrypt the encrypted message key and then uses the message key to decrypt the encrypted message.

The problem with this scheme is that the sender must know the identities of each of the recipients and must know the public key of each of the recipients. It is easier for the sender to send the message to a single machine called a distribution list exploder (DLE), which keeps track of the identities and other information for a set of recipients specified in a distribution list. This allows the DLE to forward a message to recipients specified in the distribution list. For example, in sending a message to a group of people connected with a project, a DLE can keep track of the recipients involved in the project and can route messages to the recipients. Unfortunately, existing DLE systems generally do not support sending encrypted messages. However, there have been suggestions to provide such support. (see "NETWORK SECURITY, PRIVATE Communication in a PUBLIC World," by Charlie Kaufman, Radia Perlman and Mike Spencer, Prentice-Hall 1995, page 338).

What is needed is a method and an apparatus for sending an encrypted message to multiple recipients specified in a distribution list.

SUMMARY

One embodiment of the present invention provides a system for sending an encrypted message through a distribution list exploder in order to forward the encrypted message to recipients on a distribution list. The system operates by encrypting the message at a sender using a message key to form an encrypted message. The system also encrypts the message key with a group public key to form an encrypted message key. The group public key is associated with a group private key to form a public key-private key pair associated with a group of valid recipients for the message. Next, the system sends the encrypted message and the encrypted message key to the distribution list exploder, and the distribution list exploder forwards the encrypted message to a plurality of recipients specified in the distribution list. After receiving the encrypted message and the encrypted message key, a recipient decrypts the encrypted message key (possibly with the assistance of another machine) to restore the message key. Next, the recipient decrypts the encrypted message using the message key to restore the message.

In a variation on the above embodiment, the recipient decrypts the encrypted message key by sending the encrypted message key from the recipient to a group server, which holds the group private key. The group server decrypts the encrypted message key using the group private key to restore the message key, and returns the message key to the recipient in a secure manner.

Using a group server that is separate from the DLE to decrypt the message key makes the system more secure because the group server holds the message key while the DLE holds the encrypted message. Hence, neither the group server nor the DLE can decrypt the message. Furthermore, by using a group server, group membership can be easily changed. Once a member is removed from the group, the former member is simply no longer allowed access to the group server.

Another advantage of using a group server is that tasks performed by the DLE, which tend to be time-consuming, can be outsourced to a high-performance third party computer system without compromising security. (This assumes that the group server functions are performed by a secure computer system, preferably under local control.)

The group server can return the message key to the recipient in a secure manner using a number of different methods. In a first method, the group server encrypts the message key using a public key belonging to the recipient to form a second encrypted message key, which is sent the recipient. The recipient restores the message key by decrypting the second encrypted message key with a corresponding recipient private key.

In a second method, the group server authenticates the recipient, verifies that the recipient is a member of the group of valid recipients for the message, and sends the message key to the recipient using a secure protocol, such as the secure sockets layer (SSL) protocol or the transport layer security (TLS) protocol.

In a third method, the recipient requests a certificate from a certificate server. If the recipient is a member of the group of valid recipients for the message, the certificate server returns the certificate (which includes a certificate public key) and a certificate private key. Next, the recipient sends the certificate to the group server. The group server encrypts the message key with the certificate public key to form a second encrypted message key and sends the second encrypted message key to the recipient. The recipient decrypts the second encrypted message key with the certificate private key to restore the message key.

In a variation on the third method, the recipient generates its own private key-public key pair and sends the public key to the certificate server. The certificate server returns a certificate to the recipient, which includes the public key. In this way, the certificate server is never given access to the recipient's private key.

In a fourth method, the group server encrypts the message using a group key, which is a symmetric key that is shared among members of a group of valid recipients, to form a second encrypted message key and sends the second encrypted message key to the recipient. The recipient decrypts the second encrypted message key using the shared group key to restore the message key.

In another variation on the above embodiment, instead of going to the group server, the recipient possesses the group private key and uses the group private key to decrypt the encrypted message key.

In one embodiment of the present invention, the distribution list exploder sends the encrypted message key to a group server which holds the group private key. The group server decrypts the encrypted message key using the group private key to restore the message key. Next, the group server encrypts the message key with a secret key known to the group of valid recipients for the message to form a second encrypted message key. The group server sends the second encrypted message key to the distribution list exploder. The distribution list exploder forwards the encrypted message and the second encrypted message key to the plurality of recipients. One advantage of this embodiment is that it does not require the group server to interact with all recipients, which can greatly reduce the burden on the group server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computer System

Figure 1:
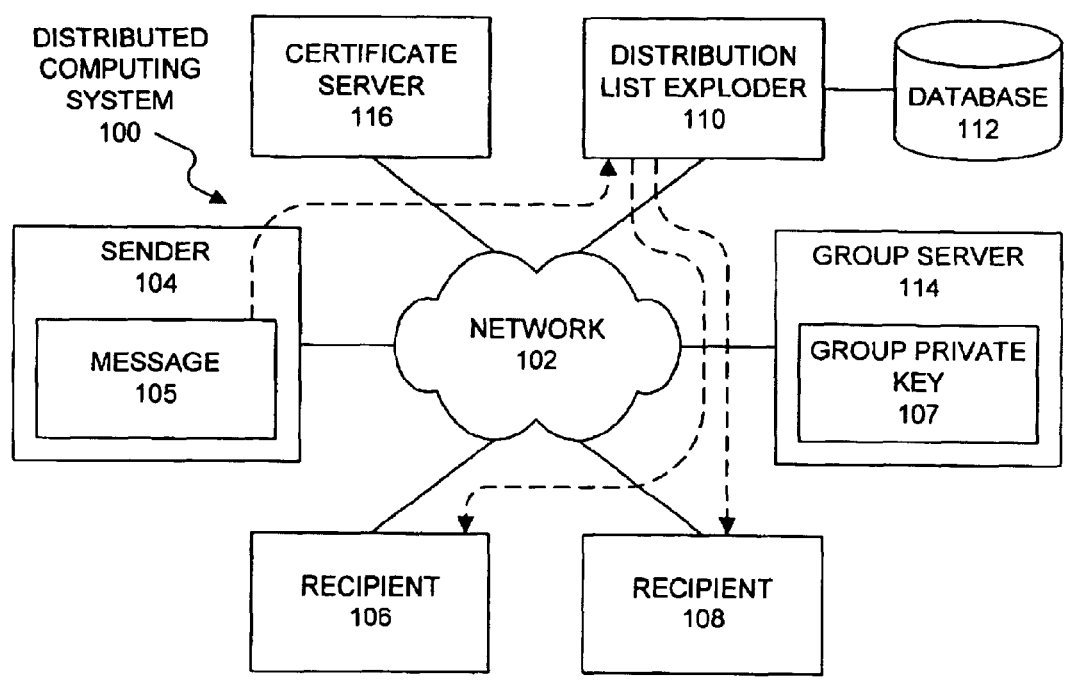
FIG. 1 illustrates a distributed computer system in accordance with an embodiment of the present invention.

FIG. 1 illustrates distributed computer system 100 in accordance with an embodiment of the present invention. The components of distributed computer system 100 are coupled together by a network 102. Network 102 can include any type of wire or wireless communication channel capable of coupling together computing nodes. This includes, but is not limited to, a local area network, a wide area network, or a combination of networks. In one embodiment of the present invention, network 102 includes the Internet.

Distributed computer system 100 also includes a number of computer systems that send and receive electronic mail (email), including sender 104 and recipients 106 and 108. Sender 104 can include any type of computing system that can send an email message, while recipients 106 and 108 can include any type of computing systems that can receive an email message.

Distributed computer system 100 includes a number of servers that can be involved in the process of encrypting and forwarding email messages. These servers include certificate server 116, group server 114 and distribution list exploder (DLE) 110.

Certificate server 116 can include any type of machine that can issue a digital certificate to a valid recipient for an email message. For purposes of this detailed disclosure, a certificate is a signed electronic document that certifies that something is true. A certificate typically indicates that someone has ownership of a public key-private key pair. For purposes of the present invention, a certificate can indicate that the holder of the certificate is a member of a group of valid recipients for a message. A certificate may include the identity of a signing authority as well as a digital signature produced with a private key (that can be validated with a corresponding public key). For example, one certificate format is defined under the X.509 standard.

Distribution list exploder (DLE) 110 can include any type of machine that can forward an email message to a group of recipients specified in a distribution list. Note that DLE 110 is coupled to database 112. Database 112 stores identification information for members of a distribution list, and can also store encryption information, such as public keys, for members of the distribution list.

Group server 114 can include any type of server that can assist in the decryption process of an email message. In one embodiment of the present invention, group server 114 holds a group private key 302, which can be used to decrypt encrypted messages sent to a group of recipients specified on a distribution list.

The system illustrated in FIG. 1 operates generally as follows. Sender 104 sends message 105 in encrypted form to DLE 110. DLE 110 looks up recipients within a corresponding distribution list for message 105 stored in database 112. DLE 110 then forwards message 105 in encrypted form to recipients 106 and 108 specified in the distribution list.

Once recipients 106 and 108 receive message 105 in encrypted form, they can access group server 114 for help in decrypting message 105. In doing so, recipients 106 and 108 can make requests to certificate server 116 to receive certificates that can be presented to group server 114 to certify that they are valid recipients for message 105.

Encryption and Decryption

Figure 2:
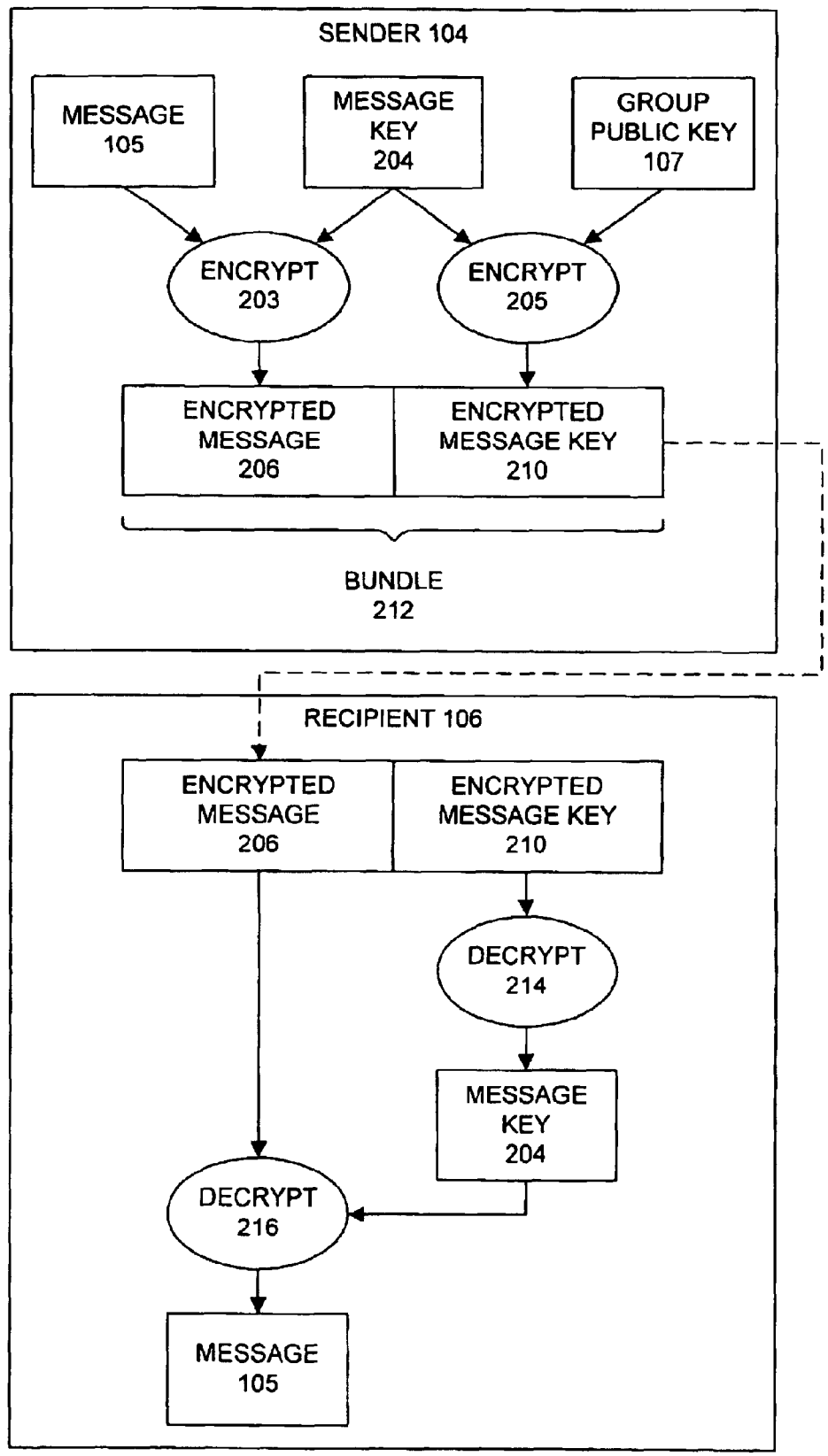
FIG. 2 illustrates portions of the encryption and decryption process in accordance with an embodiment of the present invention.

FIG. 2 illustrates portions of the encryption and decryption process in accordance with an embodiment of the present invention. Sender 104 encrypts message 105 with message key 204 to produce encrypted message 206. Message key 204 can be a per-message key that is randomly generated for message 105. Message key 204 is itself encrypted with group public key 107 to form encrypted message key 210. Group public key 107 is part of a public key-private key pair that is associated with a group of valid recipients for message 105. A data item that is encrypted with group public key 107 can be decrypted with corresponding group private key 302. Finally, encrypted message 206 is appended to encrypted message key 210 to form bundle 212, and bundle 212 is sent through DLE 110 to recipients 106 and 108.

At recipient 106, encrypted message key 210 is decrypted to restore message key 204. Note that this decryption process may involve communications with group server 114 as is described in more detail with reference to FIG. 3 below. Message key 204 is then used to decrypt encrypted message 206 to restore message 105. Note that the encryption process used for message 105 is symmetric, which means that the same message key 204 can be used to both encrypt and decrypt message 105.

Group Server

Figure 3:
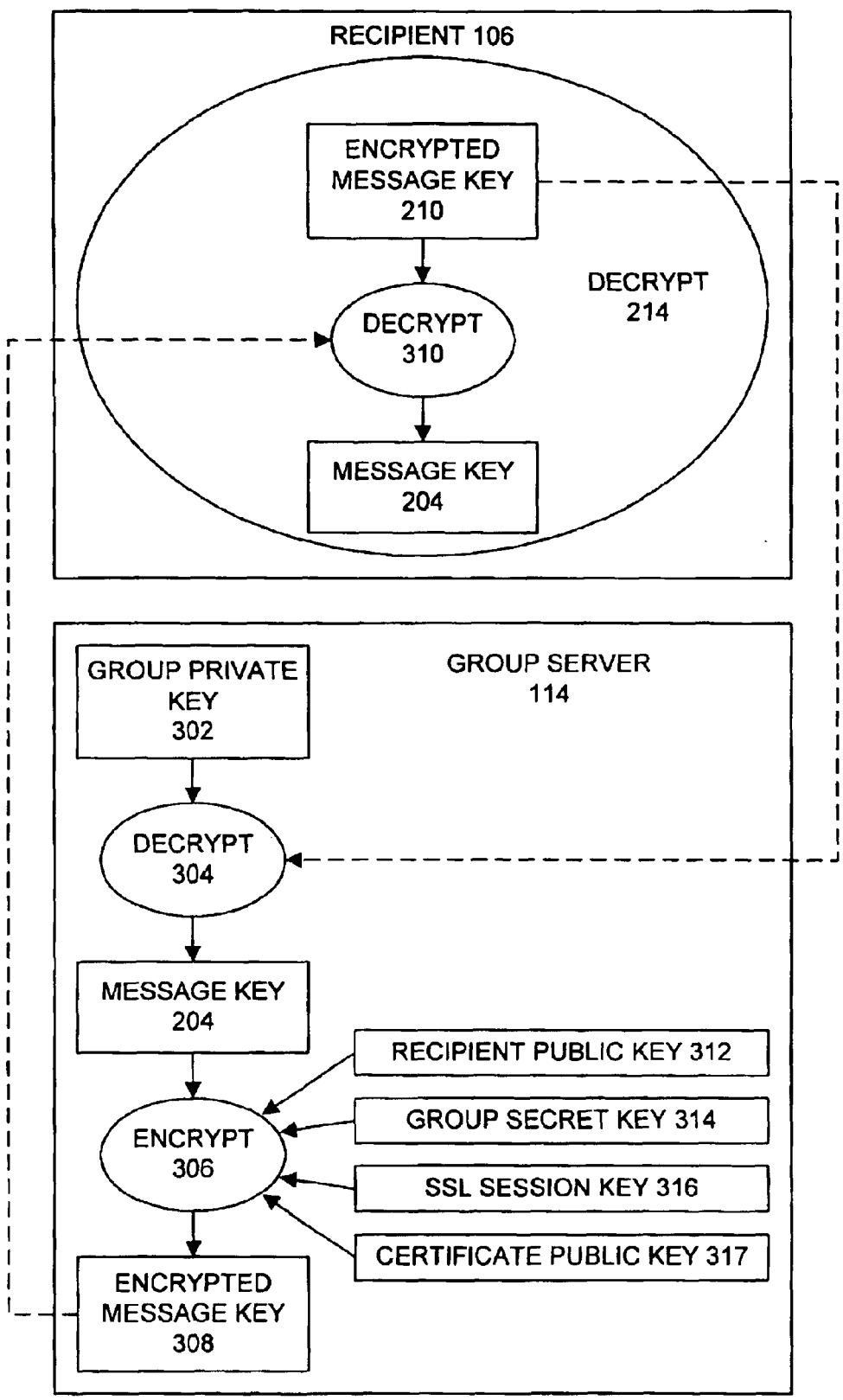
FIG. 3 illustrates how a group server is involved in the decryption process in accordance with an embodiment of the present invention.

FIG. 3 illustrates how group server 114 can be involved in the decryption process in accordance with an embodiment of the present invention. FIG. 3 illustrates in more detail how decryption module 214 within recipient 106 operates. Encrypted message key 210 is sent to group server 114, which holds group private key 302. Group server 114 decrypts encrypted message key 210 using group private key 302 to restore message key 204. In order to securely send message key 204 back to recipient 106, message key 204 is again encrypted to form encrypted message key 308.

This encryption process can happen in a number of ways. It can involve using a public key 312 belonging to recipient 106. It can involve using a group secret key 314 known only to a group of valid recipients for message 105. It can involve using a secure protocol session key, such as a secure sockets layer (SSL) session key 316. Or, it can involve using a certificate public key 317 associated with a certificate issued by certificate server 116. Encrypted message key 308 is then sent to recipient 106. Next, recipient 106 decrypts encrypted message key 308 to restore message key 204.

Note that it is possible for DLE 110 to handle both the forwarding of message 105 and the decrypting of encrypted message key 210. However, this requires DLE 110 to have access to group private key 302, which allows DLE 110 to decrypt encrypted message 206 if it wants to. This can greatly compromise system security if DLE 110 cannot be completely trusted.

On the other hand, if group private key 302 is held by group server 114, DLE 110 is not able decrypt encrypted message 206. At the same time, group server 114 does not possess encrypted message 206, so group server 114 cannot decrypt encrypted message 206 either. Hence, in this case neither DLE 110 nor group server 114 needs to be completely trusted.

Encryption Process and Decryption Process

Figure 4A:
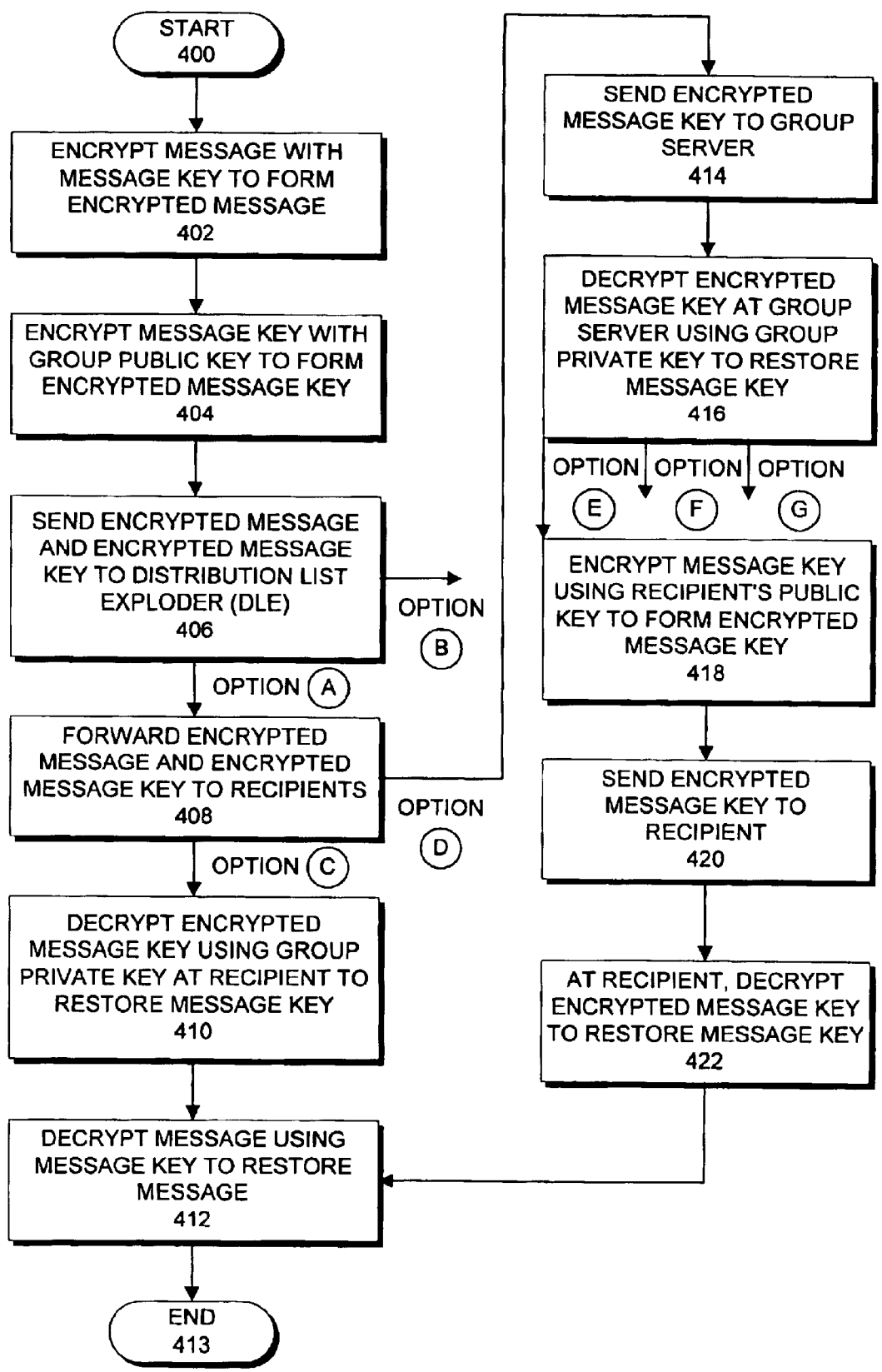
FIG. 4A is a portion of a flow chart illustrating the encryption process and the decryption process in accordance with an embodiment of the present invention.

FIG. 4A is a portion of a flow chart illustrating the encryption process and the decryption process in accordance with an embodiment of the present invention. The system starts by encrypting message 105 with message key 204 to form encrypted message 206 within sender 104 (step 402). Message key 204 is itself encrypted with group public key 107 to form encrypted message key 210 (step 404). Next, encrypted message 206 and encrypted message key 210 are sent to DLE 110 (step 406).

At this point there are two different options (A and B) associated with two different embodiments of the present invention. Under option A, DLE 110 forwards encrypted message 206 and encrypted message key 210 to recipients 106 and 108 specified in a distribution list for the message (step 408). In doing so, DLE 110 looks up information related to recipients 106 and 108 in database 112 in FIG. 1.

At this point there are two additional options (C and D) associated with different embodiments of the present invention. Under option C, a recipient 106, who receives encrypted message 206 and encrypted message key 210, decrypts encrypted message key 210 using group private key 302 to restore message key 204 (step 410). Recipient 106 then decrypts encrypted message 206 to restore message 105 using message key 204 (step 412). At this point, recipient 106 has the decrypted message 105 and the process is complete. However, note that this embodiment requires all recipients of message 105 to know group private key 302. This can create administrative problems if the group of valid recipients changes over time. New public key-private key pairs must continually be generated and distributed as the group changes.

In order to remedy this problem, option D uses group server 114 to hold group private key 302. After recipient 106 receives encrypted message 206 and encrypted message key 210, recipient 106 sends encrypted message key 210 to group server 114 (step 414). Group server 114 uses group private key 302 to decrypt encrypted message key 210 to restore message key 204 (step 416).

At this point there are three options (E, F and G) associated with different methods for returning message key 204 to recipient 106 securely. Under option E, group server 114 encrypts message key 204 using a public key belonging to recipient 106 to form encrypted message key 308 (step 418). Encrypted message key 308 is then sent to recipient 106 (step 420). Recipient 106 decrypts encrypted message key 308 using a corresponding private key belonging to recipient 106 to restore message key 204 (step 422), and then decrypts encrypted message 206 using message key 204 (step 412). At this point, recipient 106 has the decrypted message 105 and the process is complete.

Figure 4B:
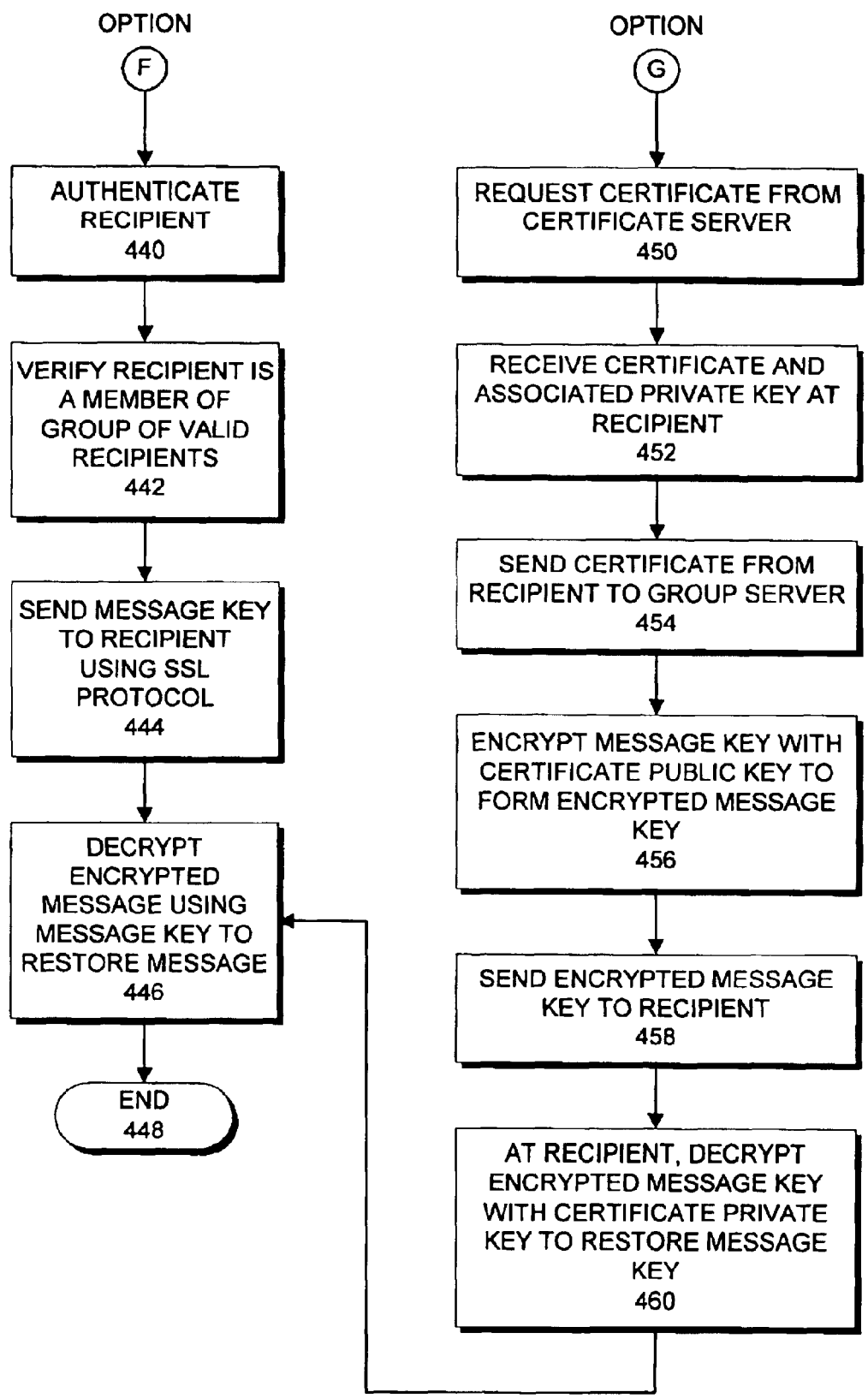
FIG. 4B is another portion of a flow chart illustrating the encryption process and the decryption process in accordance with an embodiment of the present invention.

FIG. 4B illustrates what happens during options F and G in accordance with other embodiments of the present invention. Under option F, group server 114 authenticates the identity of recipient 106 (step 440), and verifies that recipient 106 is a member of a group of valid recipients for message 105 (step 442). Next, group server 114 sends message key 204 to recipient 106 using a secure protocol, such as the SSL protocol or the TLS protocol (step 444). Note that using these protocols inherently involves encrypting and decrypting message key 204 with a secure protocol session key. Next, recipient 106 decrypts encrypted message 206 using message key 204 to restore message 105 (step 446). At this point, recipient 106 has the decrypted message 105 and the process is complete.

Under option G, recipient 106 requests a certificate from certificate server 116 (step 450). If recipient 106 can successfully authenticate itself to certificate server 116, and if recipient 106 is a member of a group of valid recipients for message 105, then recipient 106 receives a certificate and an associated private key from certificate server 116 (step 452). Recipient 106 then sends the certificate to group server 114 (step 454). Group server 114 encrypts message key 204 with certificate public key 317 to form encrypted message key 308 (step 456). Encrypted message key 308 is then sent to recipient 106 (step 458). Recipient 106 decrypts encrypted message key 308 using a corresponding certificate private key to restore message key 204 (step 460), and then decrypts encrypted message 206 using message key 204 (step 446). At this point, recipient 106 has the decrypted message 105 and the process is complete. Note that the embodiment outlined under option G allows for recipient 106 to anonymously request message key 204 without revealing its identity to group server 114.

Under option G, note that the recipient can alternatively request a certificate in advance, and can use the certificate for multiple messages. Also note that, as mentioned previously, the recipient can alternatively generate its own private key-public key pair, and can send the public key to the certificate server. The certificate server returns a certificate to the recipient, which includes the public key. In this way, the certificate server never has access to the recipient's private key.

Figure 4C:
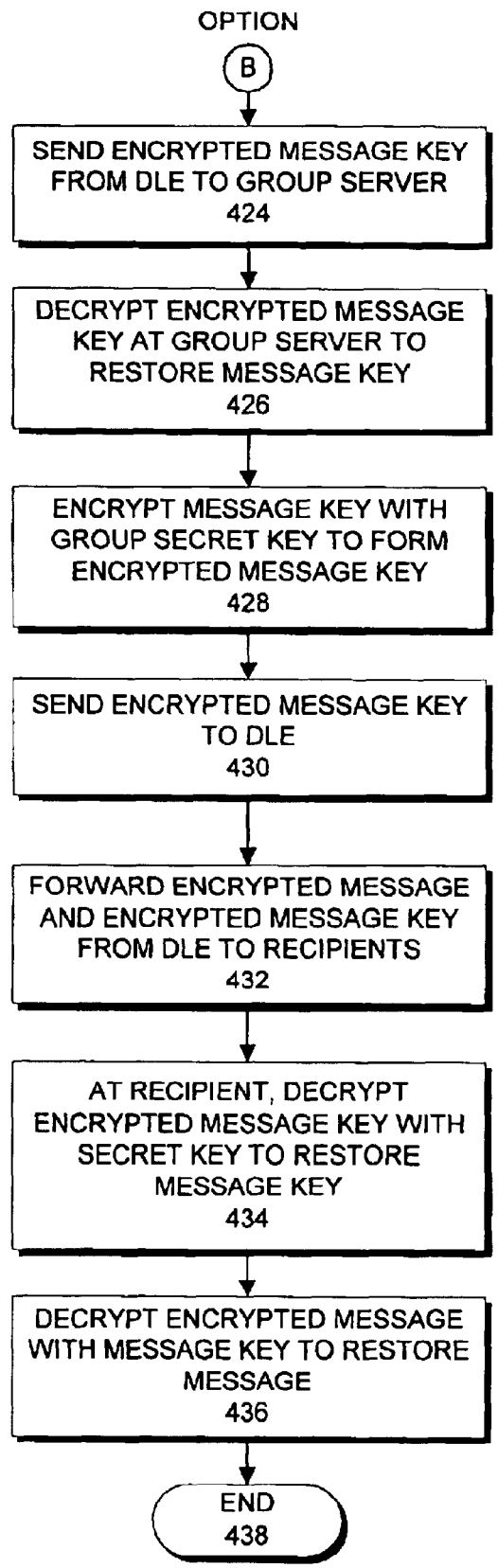
FIG. 4C is yet another portion of a flow chart illustrating the encryption process and the decryption process in accordance with an embodiment of the present invention.

FIG. 4C illustrates what happens during option B in accordance with an embodiment of the present invention. After DLE 110 receives encrypted message 206 and encrypted message key 210, DLE 110 sends encrypted message key 210 to group server 114 (step 424). Next, group server 114 decrypts encrypted message key 210 using group private key 302 to restore message key 204 (step 426). Group server 114 then encrypts message key 204 with group secret key 314 to form encrypted message key 308 (step 428), and sends encrypted message key 308 to DLE 110 (step 430). DLE 110 forwards encrypted message 206 and encrypted message key 308 to recipients 106 and 108 specified in the distribution list (step 432). Recipient 106 decrypts encrypted message key 308 using group secret key 314 to restore message key 204 (step 434). Next, recipient 106 decrypts encrypted message 206 using message key 204 to restore message 105 (step 436). At this point, recipient 106 has the decrypted message 105 and the process is complete.

Note that the embodiment associated with option B simply replaces encrypted message key 210 (which is encrypted with group public key 107) with encrypted message key 308 (which is encrypted using group secret key 314). Under option B, recipients 106 and 108 are presumed to know group secret key 314 instead of group private key 302. This is advantageous because if group membership changes, propagating a new group public key to all potential senders can be a time-consuming and error-prone task. In contrast, propagating a new group secret key to members of a group of valid recipients is an easier task.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for sending a message that is encrypted through a distribution list exploder that forwards the message to recipients on a distribution list, comprising:

encrypting the message at a sender using a message key to form an encrypted message, the message key being randomly selected for the message;

encrypting the message key with a group public key to form an encrypted message key, the group public key being associated with a group private key to form a public key-private key pair associated with a group of valid recipients for the message, wherein neither the sender nor the recipients on the distribution list need to know the group private-key to decrypt the encrypted message-key;

sending the encrypted message and the encrypted message key to the distribution list exploder, the distribution list exploder being configured to forward the encrypted message to a plurality of recipients specified in the distribution list;

forwarding the encrypted message and the encrypted message key from the distribution list exploder to the plurality of recipients;

receiving the encrypted message and the encrypted message key at a recipient from the plurality of recipients;

sending the encrypted message key from the recipient to a group server, the group server possessing the group private key;

decrypting the encrypted message key at the group server using the group private key to restore the message key;

communicating the message key to the recipient in a secure manner;

decrypting the encrypted message at the recipient using the message key to restore the message;

wherein the distribution list exploder forwards the encrypted message and the encrypted message key without communicating with the group server;

whereby causing the recipient to contact the group server directly to decrypt the encrypted message key relieves the distribution list exploder of the burden of communicating with the group server to decrypt the encrypted message key.

2. A method for sending a message that is encrypted through a distribution list exploder that forwards the message to recipients on a distribution list, comprising:

encrypting the message at a sender using a message key to form an encrypted message;

encrypting the message key with a group public key to form an encrypted message key, the group public key being associated with a group private key to form a public key-private key pair associated with a group of valid recipients for the message, wherein neither the sender nor the recipients on the distribution list need to know the group private-key to decrypt the encrypted message-key; and sending the encrypted message and the encrypted message key to the distribution list exploder, the distribution list exploder being configured to forward the encrypted message to a plurality of recipients specified in the distribution list;

wherein the distribution list exploder forwards the encrypted message and the encrypted message key without communicating with a group server;

whereby causing the recipient to contact a group server directly to decrypt the encrypted message key relieves the distribution list exploder of the burden of communicating with the group server to decrypt the encrypted message key.

3. The method of claim 2, further comprising:

sending the encrypted message key from the distribution list exploder to a group server, the group server possessing the group private key;

decrypting the encrypted message key at the group server using the group private key to restore the message key;

encrypting the message key with a secret key to form a second encrypted message key, the secret key being known to the group of valid recipients for the message;

wherein encrypting the message key with the secret key involves using a symmetric encryption mechanism so that the second encrypted message key can be decrypted using the secret key;

sending the second encrypted message key from the group server to the distribution list exploder; and forwarding the encrypted message and the second encrypted message key from the distribution list exploder to the plurality of recipients.

4. The method claim 3, further comprising:

decrypting the encrypted message key at a recipient from the plurality of recipients using the secret key to restore the message key; and decrypting the encrypted message with the message key to restore the message at the recipient.

5. The method of claim 2, further comprising:

decrypting the encrypted message key at the distribution list exploder using the group private key to restore the message key;

encrypting the message key with a secret key to form a second encrypted message key, the secret key being known to the group of valid recipients for the message;

wherein encrypting the message key with the secret key involves using a symmetric encryption mechanism so that the second encrypted message key can be decrypted using the secret key; and sending the encrypted message and the second encrypted message key from the distribution list exploder to the plurality of recipients.

6. A computer readable storage medium storing instructions that when executed by a computer cause the computer to perform a method for sending a message that is encrypted through a distribution list exploder that forwards the message to recipients on a distribution list, comprising:

encrypting the message at a sender using a message key to form an encrypted message;

encrypting the message key with a group public key to form an encrypted message key, the group public key being associated with a group private key to form a public key-private key pair associated with a group of valid recipients for the message, wherein neither the sender nor the recipients on the distribution list need to know the group private-key to decrypt the encrypted message-key; and sending the encrypted message and the encrypted message key to the distribution list exploder, the distribution list exploder being configured to forward the encrypted message to a plurality of recipients specified in the distribution list;

wherein the distribution list exploder forwards the encrypted message and the encrypted message key without communicating with a group server;

whereby causing the recipient to contact a group server directly to decrypt the encrypted message key relieves the distribution list exploder of the burden of communicating with the group server to decrypt the encrypted message key.

7. An apparatus that facilitates sending a message that is encrypted through a distribution list exploder that forwards the message to recipients on a distribution list, comprising:

an encryption mechanism, that is configured to,
  encrypt the message using a message key to form an encrypted message, and to
  encrypt the message key with a group public key to form an encrypted message key, the group public key being associated with a group private key to form a public key-private key pair associated with a group of valid recipients for the message, wherein neither the sender nor the recipients on the distribution list need to know the group private-key to decrypt the encrypted message-key; and a sending mechanism that is configured to send the encrypted message and the encrypted message key to the distribution list exploder, the distribution list exploder being configured to forward the encrypted message to a plurality of recipients specified in the distribution list;

wherein the distribution list exploder forwards the encrypted message and the encrypted message key without communicating with a group server;

whereby causing the recipient to contact a group server directly to decrypt the encrypted message key relieves the distribution list exploder of the burden of communicating with the group server to decrypt the encrypted message key.

8. The apparatus of claim 7, further comprising:

a second sending mechanism that is configured to send the encrypted message key from the distribution list exploder to a group server, the group server possessing the group private key;

a decryption mechanism within the group server that is configured to decrypt the encrypted message key using the group private key to restore the message key;

a second encryption mechanism within the group server that is configured to encrypt the message key with a secret key to form a second encrypted message key, the secret key being known to the group of valid recipients for the message;

wherein the second encryption mechanism includes a symmetric encryption mechanism so that the second encrypted message key can be decrypted using the secret key;

a third sending mechanism within the group server that is configured to send the second encrypted message key to the distribution list exploder; and a distribution mechanism within the distribution list exploder that is configured to forward the encrypted message and the second encrypted message key to the plurality of recipients.

9. A method for receiving a message that is encrypted through a distribution list exploder that forwards the message to recipients on a distribution list, comprising:

receiving an encrypted message and an encrypted message key from the distribution list exploder at a recipient;

wherein the encrypted message contains the message that is encrypted using a message key;

wherein the encrypted message key contains the message key that is encrypted using a group public key, the group public key being associated with a group private key to form a public key-private key pair associated with a group of valid recipients for the message, wherein neither the sender nor the recipients on the distribution list need to know the group private-key to decrypt the encrypted message-key;

sending the encrypted message key from the recipient to a group server, the group server possessing the group private key;

allowing the group server to decrypt the encrypted message key using the group private key to restore the message key; and receiving the message key from the group server in a secure manner;

decrypting the encrypted message key at the recipient to restore the message key; and decrypting the encrypted message at the recipient using the message key to restore the message;

wherein the distribution list exploder forwards the encrypted message and the encrypted message key without communicating with a group server;

whereby causing the recipient to contact the group server directly to decrypt the encrypted message key relieves the distribution list exploder of the burden of communicating with the group server to decrypt the encrypted message key.

10. The method of claim 9, wherein receiving the message key from the group server in the secure manner comprises:

allowing the group server to encrypt the message key using a recipient public key belonging to the recipient to form a second encrypted message key, the recipient public key being associated with a recipient private key to form a public key-private key pair associated with the recipient;

receiving the second encrypted message key from the group server; and decrypting the second encrypted message key with the recipient private key to restore the message key.

11. The method of claim 9, wherein receiving the message key from the group server in the secure manner comprises:

authenticating the recipient to the group server;

allowing the group server to verify that the recipient is a member of the group of valid recipients for the message; and receiving the message key from the group server at the recipient using a secure protocol.

12. The method of claim 11, wherein the secure protocol includes one of, the transport layer security (TLS) protocol and the secure sockets layer (SSL) protocol.

13. The method of claim 9, wherein receiving the message key from the group server in the secure manner comprises:

making a request from the recipient to a certificate server for a certificate, the certificate including a certificate public key, the certificate public key being associated with a certificate private key to form a public key-private key pair;

receiving the certificate from the certificate server only if the recipient is a member of the group of valid recipients for the message;

sending the certificate from the recipient to the group server;

allowing the group server to encrypt the message key with the certificate public key to form a second encrypted message key;

receiving the second encrypted message key at the recipient; and decrypting the second encrypted message key with the certificate private key to restore the message key.

14. The method of claim 9, wherein receiving the message key from the group server in the secure manner comprises:

allowing the group server to encrypt the message key using a group secret key to form a second encrypted message key, the group secret key being a symmetric key known to the group of valid recipients;

receiving the second encrypted message key at the recipient; and decrypting the second encrypted message key with the group secret key to restore the message key.

* * * * *